No. 872,554. PATENTED DEC. 3, 1907.
W. BREWSTER.
VEHICLE SEAT.
APPLICATION FILED OCT. 23, 1906.

UNITED STATES PATENT OFFICE.

WILLIAM BREWSTER, OF MOUNT CARMEL, CONNECTICUT.

VEHICLE-SEAT.

No. 872,554.     Specification of Letters Patent.     Patented Dec. 3, 1907.

Application filed October 23, 1906. Serial No. 340,163.

*To all whom it may concern:*

Be it known that I, WILLIAM BREWSTER, of Mount Carmel, New Haven county, Connecticut, have invented an Improvement in Vehicle-Seats, of which the following is a specification, reference being had to the accompanying drawing, in which—

Figure 1:
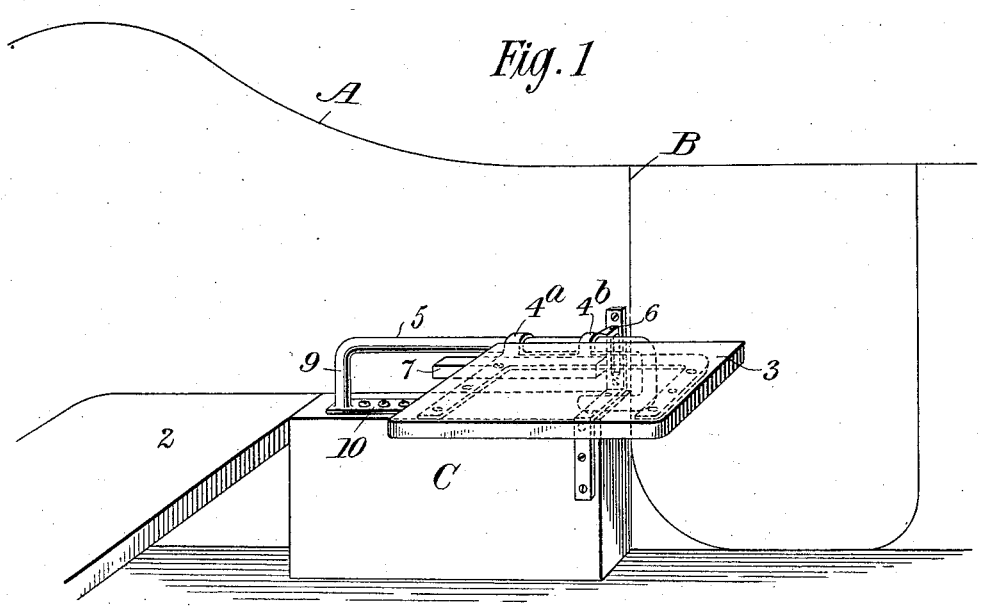
Figure 2:
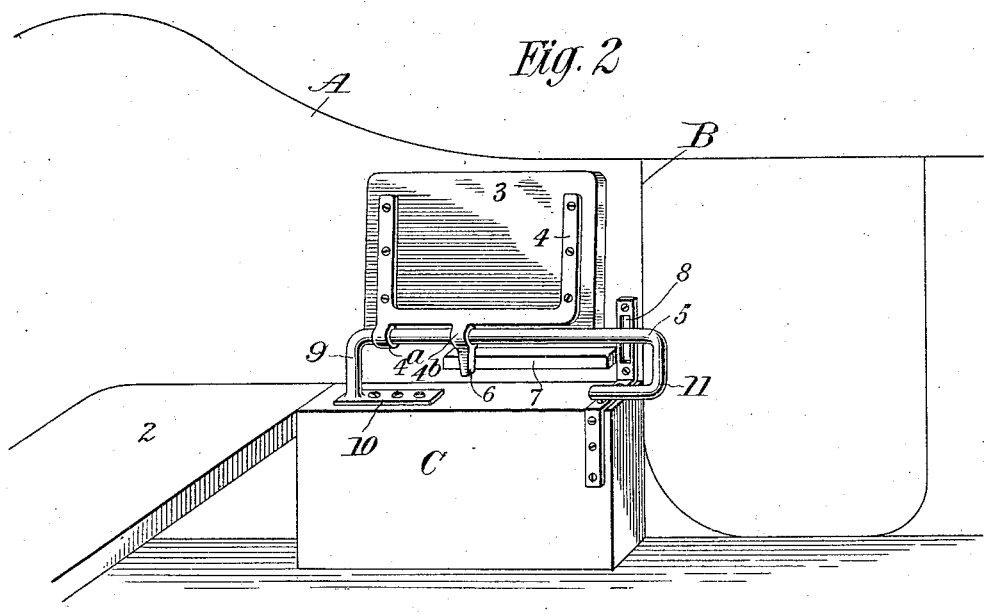

Figure 1 is a perspective view of my improved seat applied to an automobile; and Fig. 2 is a similar view showing the seat folded back.

This invention relates to vehicle seats, and its prime object is to provide an improved supplemental or auxiliary seat which may be conveniently brought into position for use and also folded into compact form when not in use.

While the seat is capable of general use, it is particularly designed for the tonneau portions of automobile bodies, and it is proposed to situate the supplemental seat between the usual back seat and one of the side doorways of the body. When the seat is in use, it obstructs the doorway, and therefore it is an important object of the invention to permit of the seat being moved to one side of the doorway and to be folded against one side of the vehicle body, thereby to allow of the free use of the doorway.

A further object of the invention is to have the device entirely complete in itself, in order that it may be mounted in any of the ordinary types of automobiles or vehicles without requiring any change or alterations therein.

With these and other objects in view, the present invention consists in the combination and arrangement of parts, as will be hereinafter more fully described, shown in the accompanying drawings and particularly pointed out in the appended claims, it being understood that changes in the form, proportions, size and minor details may be made within the scope of the claims without departing from the spirit or sacrificing any of the advantages of the invention.

To illustrate the application and operation of the present invention, there has been shown in the accompanying drawing a portion A of the tonneau of an ordinary type of automobile having the usual rear transverse seat 2, and a side doorway B, somewhat in front of the seat.

In carrying out the present invention, a suitable support such as a block C, is suitably secured within the body of the vehicle between the transverse seat 2 and the doorway B, which block is intended to serve as a support for the supplemental seat. The supplemental seat 3 is of any approved shape and size, according to the dimensions of the vehicle body. To the underside of this seat there is secured a yoke-shaped bracket 4, provided at its rear end with a tubular knuckle or eye $4^a$, there being a similar knuckle or eye $4^b$ upon an intermediate portion of the bracket, preferably about midway between the front and rear ends of the seat. These knuckles or eyes are alined longitudinally of the seat adjacent what is its lower edge when folded into an inoperative position, and are designed to slide and also to rotate upon a guidebar 5, disposed longitudinally of the vehicle and mounted upon the base or supporting member C. The guidebar 5 is, of course, spaced above the base or support C, preferably by means of a leg standard 9, at the rear end of the bar, the arm of the standard being provided with a bracket or base plate 10, resting flat upon the top of the support, and secured thereto by means of suitable fastenings. The forward end of the guidebar projects somewhat in advance of the base C, and is provided with a depending rebent elbow 11, having its lower extremity resting upon the top of the base C.

When the seat is not in use, as shown in Fig. 2 of the drawing, it is held in its upright folded position by means of a latch member 6, which is carried by the eye or knuckle $4^b$ and engages a keeper member 7, which is in the nature of a ledge or bar secured to the adjacent side of the vehicle body, and extends rearwardly a suitable distance from a point slightly in rear of the doorway, whereby the latch 6 is capable of engaging the keeper member throughout a considerable portion of the sliding movement of the seat, so as to effectually prevent dropping of the seat until it has been moved forwardly and the latch disengaged from keeper member. In the operative position of the seat, as shown in Fig. 1 of the drawing, the latch member 6 is received within the slot or socket of a stop device 8, the latter being secured to the adjacent side of the vehicle body between the front end of the keeper member 7 and the rear edge of the doorway.

In practice, the seat occupies the position shown in Fig. 2, when not in use, and is held against accidental displacement by jolting of the vehicle through the medium of the latch member 6 bearing against the keeper member 7. When it is desired to use the seat, it is first slid forwardly until the latch member 6 is free from the forward end of the keeper member 7, whereupon the seat is swung downwardly and the latch 6 will swing into the slot or socket of the stop device 8 and engage the upper wall of the socket, as shown in Fig. 1, when the seat has assumed a horizontal position. It will here be noted that when the seat is in its operative position, it is held against sliding movement on the bar 5 by reason of the latch 6 fitting snugly within the socket or slotted portion of the stop device 8.

To fold the seat, it is first swung upwardly until the latch 6 disengages the stop device 8 and is beyond the front face of the keeper member 7, whereupon the seat may be slid rearwardly and will be held in its upright folded position by reason of the latch 6 engaging the front face of the keeper member 7.

It will here be explained that the base member C should terminate at or short of the rear side of the doorway, so as not to obstruct the latter, but the front end of the guide bar 5 should be projected somewhat in front of the base member, in order that the seat may be slid as far as possible from the main seat 2. In this connection, it will be noted that the rebent or elbowed portion 11 of the guide bar brings the support for the forward end of the bar in front of the stop device 8, thereby to accommodate the latch 6 and permit of it being unobstructedly moved into engagement with the stop device 8.

Having thus described the invention what is claimed and is desired to secure by Letters Patent is:

1. A device of the class described comprising a support and guide bar having one end provided with a leg standard connected to the support, the other end of the bar projecting beyond the support and having a return elbow bearing against the support to space the bar therefrom, a seat mounted to slide and rotate upon the guide bar, a latch member carried by the seat, a keeper bar in substantial parallelism with the guidebar in position for frictional engagement by the latch to prevent swinging of the seat during its sliding movement, and a stop device disposed for engagement by the latch when the latter has cleared the keeper bar and the seat has been turned into its operative position.

2. A device of the class described comprising a guide bar, a seat, a slide carried by the seat and embracing the guide bar to slide and turn thereon, a latch member carried by the slide, a keeper bar below and in substantial parallelism with the guide bar in position for frictional engagement by the latch to prevent swinging of the seat during its sliding movement, and means disposed for engagement by the latch when the latter has cleared the keeper bar and the seat has been turned into its operative position.

3. The combination with a vehicle body, of a guide bar spaced from one side of the body, a seat slidable upon the guide bar and capable of being swung thereon into operative and inoperative positions, a keeper bar secured to the adjacent side of the vehicle below and in substantial parallelism with the guide bar, a latch member carried by the seat and frictionally engaging the keeper to support the seat in an upright position, the seat capable of being turned down into a horizontal position when the latch has cleared one end of the keeper bar, and means upon the side of the vehicle for engagement by the latch in the horizontal position of the seat to support the seat in its operative position.

In testimony whereof, I have hereunto set my hand.

WILLIAM BREWSTER.

Witnesses:
WASHINGTON H. IRWIN,
LEDYARD A. LANDIS.